United States Patent
Ito et al.

(10) Patent No.: US 7,203,011 B2
(45) Date of Patent: Apr. 10, 2007

(54) LENS DEVICE, IMAGING DEVICE USING THE SAME AND CELL-PHONE WITH CAMERA USING THE SAME

(75) Inventors: Yoshihiro Ito, Saitama (JP); Yoji Naka, Saitama (JP); Mitsuo Manabe, Saitama (JP)

(73) Assignees: Fujifilm Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/230,563

(22) Filed: Sep. 21, 2005

(65) Prior Publication Data

US 2006/0061885 A1   Mar. 23, 2006

(30) Foreign Application Priority Data

Sep. 22, 2004  (JP)  ............................. 2004-274892

(51) Int. Cl.
  *G02B 7/02*  (2006.01)
(52) U.S. Cl. .................. 359/811; 359/813; 359/814
(58) Field of Classification Search ............... 359/811, 359/813, 814, 819, 823, 824, 687, 694
See application file for complete search history.

(56) References Cited

U.S. PATENT DOCUMENTS

| 4,596,449 | A |   | 6/1986 | Iwata et al. |
| 4,605,286 | A |   | 8/1986 | Sumi |
| 5,572,372 | A | * | 11/1996 | Sekine et al. ............... 359/824 |
| 6,800,970 | B2 |   | 10/2004 | Aoshima |
| 2002/0044260 | A1 | * | 4/2002 | Takahashi et al. ............ 353/31 |

FOREIGN PATENT DOCUMENTS

| JP | 56-147132 A | 11/1981 |
| JP | 62-195615 A | 8/1987 |

* cited by examiner

*Primary Examiner*—Timothy Thompson
(74) *Attorney, Agent, or Firm*—Sughrue Mion, PLLC

(57) ABSTRACT

An imaging device comprises a first lens unit and a second lens unit. A first fixed barrel of the first lens unit movably holds a first lens frame, which holds a first lens group, in an optical-axis direction. A second fixed barrel of the second lens unit movably holds a second lens frame, which holds a second lens group, in the optical-axis direction. The first and second fixed barrels are secured in series in the optical-axis direction. The first and second lens units are adapted to be easily assembled in series in the optical-axis direction. Misalignment of the plural lens groups is prevented, and the first and second lens groups are accurately and individually moved in the optical-axis direction.

14 Claims, 5 Drawing Sheets

LENS DEVICE, IMAGING DEVICE USING THE SAME AND CELL-PHONE WITH CAMERA USING THE SAME

BACKGROUND OF THE INVENTION

1. Field of the Invention

The present invention relates to a lens device for moving lenses in an optical-axis direction, an imaging device using the lens device, and a cell-phone with a camera using the lens device.

2. Description of the Related Art

In a conventionally known electronic camera, a zoom lens barrel is adapted to protrude in two or three steps for the purpose of downsizing the camera. When the camera is not used, the zoom lens barrel is collapsed to minimize the size in an optical-axis direction. Meanwhile, an imaging device built in a small-sized equipment of a cell-phone and so forth is extremely small in comparison with a normal electronic camera. Thus, components of such an imaging device, which are a lens, a CCD (Charge Coupled Device) and so forth, are considerably restricted regarding its size. Moreover, a space for containing the components is considerably restricted as well. For this reason, this kind of the small-sized equipment has an insufficient shooting function and insufficient image quality on a taken image when used as an alternative equipment of the electronic camera. In general, this kind of the small-sized equipment is restrictedly used for a case of shooting in that image quality is not particularly required. For example, this kind of the small-sized equipment is used for a case in that an image is taken as a substitution of a note, and for a case in that an image for standby display of a cell-phone is taken.

With respect to the above, in resent years, a downsized high-pixel CCD and a downsized lens have been developed so that quality of an image, which is taken by using the small-sized equipment of the cell-phone, a PDA and so forth, is rapidly improved. The remaining problem is to enhance the shooting function, and it is especially desired to provide an automatic-focus function and a zoom function, which are usually provided to the normal electronic camera, to the small-sized equipment. Some of the recent camera-equipped cell-phones have both of the 2× optical zoom function and the automatic-focus function (Trade Name: Vodafone V602SH).

The automatic-focus function and the zoom function are carried out by moving lenses inside the imaging device in an optical-axis direction. As to the electronic cameras and electronic video cameras, some lens-driving methods are known. In one of the lens-driving methods, rotation of a DC motor and a stepping motor is utilized, and in another thereof, contracting and expanding of a piezoelectric device are utilized. When adopting these methods to the small-sized equipment of the cell-phone and so forth, it is considered that a method employing a hollow stepping motor is preferable in view of miniaturization of the device and accuracy for controlling the movement of the lens. In this method employing the hollow stepping motor, the lens is moved by supplying a pulse current to a stator surrounding a cylindrical hollow rotor, which surrounds a lens barrel holding the lens. As the lens-driving method utilizing the hollow stepping motor, is proposed for example a method in which a lens group is moved inside a lens unit (fixed barrel) in an optical-axis direction (see Japanese Patent Laid-Open Publication No. 56-147132, for instance).

However, when the zoom function and the automatic-focus function are provided to the camera used for the small-sized equipment, a number of parts increases. Consequently, there arise problems in that assembling a camera unit becomes difficult and production cost increases. Moreover, there arises another problem in that it is difficult to prevent positions of the lens groups from shifting and to accurately adjust optical axes of the lens groups.

SUMMARY OF THE INVENTION

In view of the foregoing, it is a primary object of the present invention to provide a lens device in which production cost is reduced and assembly is easy.

It is a second object of the present invention to provide a lens device in which designing is simplified.

It is a third object of the present invention to provide a lens device in which positions of lens groups are prevented from shifting and the lens groups are accurately and individually moved in an optical-axis direction.

In order to achieve the above and other objects, the lens device according to the present invention comprises a first lens unit, a second lens unit and a lens controller. The first lens unit includes a first fixed barrel for movably holding a first lens frame, which holds a first lens group, in an optical-axis direction. The first lens unit further includes a first driver incorporated in the first fixed barrel. The first driver moves the first lens frame in response to an input of a first lens-movement signal. The second lens unit includes a second fixed barrel for movably holding a second lens frame, which holds a second lens group, in the optical-axis direction. The second fixed barrel is secured to the first fixed barrel in series in the optical-axis direction. The second lens unit further includes a second driver incorporated in the second fixed barrel. The second driver moves the second lens frame in response to an input of a second lens-movement signal. The lens controller inputs the first and second lens-movement signals into the first and second drivers respectively.

According to the lens device of the present invention, the first and second lens units are connected in series in the optical-axis direction after being separately assembled. It is possible to easily assemble the lens device comprising the lens groups and the drivers for the respective lens groups. Moreover, misalignment of the lens groups is prevented and it is possible to accurately and individually move the lens groups in the optical-axis direction. Production costs of the lens device may be kept down.

In a preferred embodiment, the first driver comprises a cylindrical first stator for generating magnetic fields in the first fixed barrel, and a cylindrical first rotor coaxially disposed with the first stator. The first rotor is rotated relative to the first stator in virtue of the magnetic field generated by the first stator. The first lens frame is disposed inside the first rotor and holds the first lens group so as to make the optical axis of the first lens group coincide with an axis of the rotor. The first driver further comprises a first conversion mechanism, which converts a direction of a rotational force of the first rotor into the optical-axis direction of the first lens group to transmit the rotational force to the first lens frame. Similarly, in the preferred embodiment, the second driver comprises a cylindrical second stator for generating magnetic fields in the second fixed barrel, and a cylindrical second rotor coaxially disposed with the second stator. The second rotor is rotated relative to the second stator in virtue of the magnetic field generated by the second stator. The second lens frame is disposed inside the second rotor and holds the second lens group so as to make the optical axis of the second lens group coincide with an axis of the cylindrical rotor. The second driver further comprises a second conversion mechanism, which converts a direction of a rotational force of the second rotor into the optical-axis direction of the second lens group to transmit the rotational force to the second lens frame.

According to the lens device of the present invention, the first and second lens units are easily connected in series in the optical-axis direction, even if the lens device is installed in a small-sized equipment of a cell-phone and so force. Moreover, misalignment of the lens groups is prevented and it is possible to accurately and individually move the lens groups in the optical axis direction.

In a preferred embodiment, the first lens unit comprises a first connector and the second lens unit comprises a second connector. The first connector is formed at a rear side of the first fixed barrel to connect with the second lens unit. The second connector is formed at a front side of the second fixed barrel to connect with the first lens unit. The first and second lens units are fixed via the first and second connectors in series in the optical-axis direction. It is preferable to fix the first and second lens units by means of screws formed at the first and second connectors.

In the preferred embodiment, the first lens unit further comprises a first straight groove formed in the first lens frame, and a first guide protrusion for leading the first straight groove. When the first lens frame moves in the optical-axis direction, the first straight groove and the first guide protrusion straightly move the first lens group, which is held by the first lens frame, in the optical-axis direction without rotating the first lens frame. Similarly, the second lens unit further comprises a second straight groove formed in the second lens frame, and a second guide protrusion for leading the second straight groove. When the second lens frame moves in the optical-axis direction, the second straight groove and the second guide protrusion straightly move the second lens group, which is held by the second lens frame, in the optical-axis direction without rotating the second lens frame. Meanwhile, it is preferable that a diameter of the rear side of the first fixed barrel is substantially same with that of the front side of the second fixed barrel.

The above-mentioned lens device may be employed in imaging devices of an instant camera, a silver-salt camera, an electronic camera and so forth. Moreover, the lens device may be employed in an optical device, for example, in a pick-up lens unit to be used for a DVD, a CD-ROM and so forth. Further, the lens device may be employed in a projector.

The above-mentioned lens device may be employed in an imaging device comprising a solid-state image sensor. In this case, the rear side of the second fixed barrel is secured so as to confront a light-receiving surface of the solid-state image sensor. Furthermore, the lens device may be employed in a camera-equipped cell-phone.

According to the present invention, it is possible to provide the lens device, the imaging device and the camera-equipped cell-phone in which assembling is easily performed at low production cost and the lens groups are accurately and individually moved in the optical-axis direction in the state that the misalignment of the lens groups are prevented.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
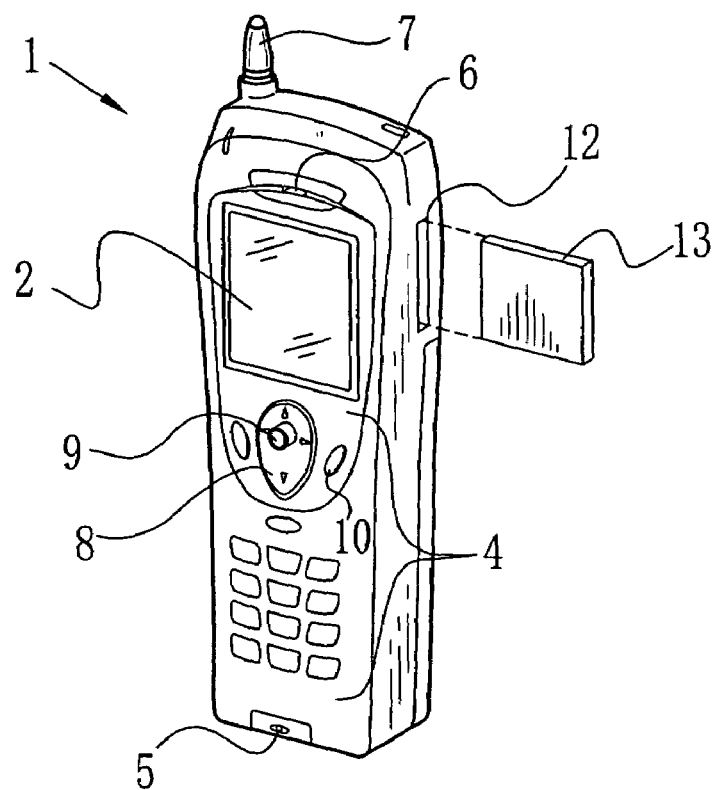
FIG. 1 is a front perspective view showing a camera-equipped cell-phone according to the present invention.
Figure 2:
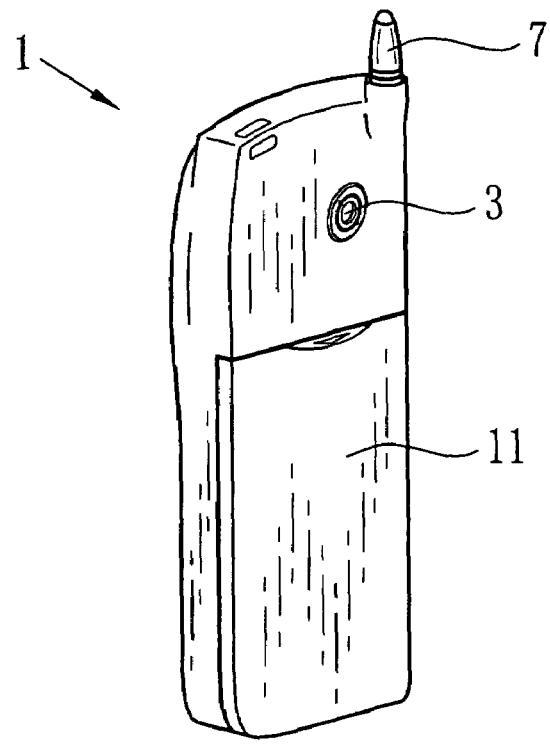
FIG. 2 is a rear perspective view showing the camera-equipped cell-phone.

An embodiment of a camera-equipped cell-phone according to the present invention is described below. As shown in FIGS. 1 and 2, the camera-equipped cell-phone comprises a phone body 1 of a longitudinal parallelepiped shape. A liquid-crystal display (displaying member) 2 for showing communication information and images is disposed at a central upper portion of the front of the phone body 1. At an upper portion of the rear of the phone body 1, a taking lens 3 is disposed. The taking lens 3 constitutes a part of an electronic camera 30. The phone body 1 is also provided with a lid 11 for removing a battery pack. Although the inside of the taking lens 3 is described later in detail with FIGS. 4 to 6, two lens groups 32 and 33 are disposed. In addition, lens drivers (first and second drivers) are disposed as well to individually move the lens groups 32 and 33 in an optical-axis direction. Further, a CCD image sensor (solid-state image sensor) 36 is disposed behind the taking lens 3. A subject image taken by the CCD image sensor 36 is shown on the liquid-crystal display 2.

The phone body 1 is provided with a button group 4 disposed under the liquid-crystal display 2. The button group 4 includes a plurality of buttons for performing designation/selection of a telephone number, letters and image data. The button group 4 further includes a numeric keypad for directly inputting a telephone number. A microphone 5 constituting a part of a telephone receiver is disposed under the numeric keypad. Incidentally, a right button 10 disposed under the liquid-crystal display is a shooting-mode button 10 for starting and halting a shooting-mode function.

Upon starting a shooting mode by the shooting-mode button 10, the subject image taken by the CCD image sensor (solid-state image sensor) 36 is shown on the liquid-crystal display 2. During the shooting mode, right-and-left buttons of an arrow key 8 disposed at a central under portion of the liquid-crystal display 2 work as buttons for changing zoom magnification (optical zoom and electronic zoom). The zoom magnification is increased by pressing the right button of the arrow key 8 and is decreased by pressing the left button thereof. Meanwhile, a central button of the arrow key 8 is a release button 9 for taking a subject with the electronic camera during the shooting mode.

A speaker 6 constituting a part of the telephone receiver is disposed above the liquid-crystal display 2. Further, a top side of the phone body 1 is provided with an antenna 7 for performing radio communication with a public line. Incidentally, the liquid-crystal display 2 is used as a viewfinder under the shooting mode to display a through image, which is used for confirming the subject, on the basis of an image signal outputted from the CCD image sensor 36.

When the camera-equipped cell-phone 1 is used to take the subject, the taking lens 3 disposed at the rear of the phone body 1 faces the subject and the subject image taken by the CCD image sensor 36 is shown on the liquid-crystal display 2. After confirming the image shown on the liquid-crystal display 2, the release button 9 provided on the phone body 1 is pressed to take the subject. In the meantime, besides the shooting mode for taking the image, the phone body 1 has a reproducing mode for showing the taken image.

Further, the phone body 1 is provided with a slot 12 into which an external memory card 13 is inserted. The memory card 13 is connected to the phone body 1 so that taken-image data recorded in the memory card 13 is shown on the liquid-crystal display 2 as a reproduction image under the reproducing mode.

Next, an electrical structure of the electronic camera according to the present invention is described below with FIG. 3. A CPU 31 shown in FIG. 3 controls each portion of the electronic camera 30 in accordance with operation signals inputted from the arrow key 8 and the release button 9. A ROM 31*a* stores a control program to be executed by the CPU 31. The control program includes a mode-control program for switching the operation mode. A PAM 31*b* is a working memory to be used at a time when the CPU 31 executes the control program.

Figure 4:
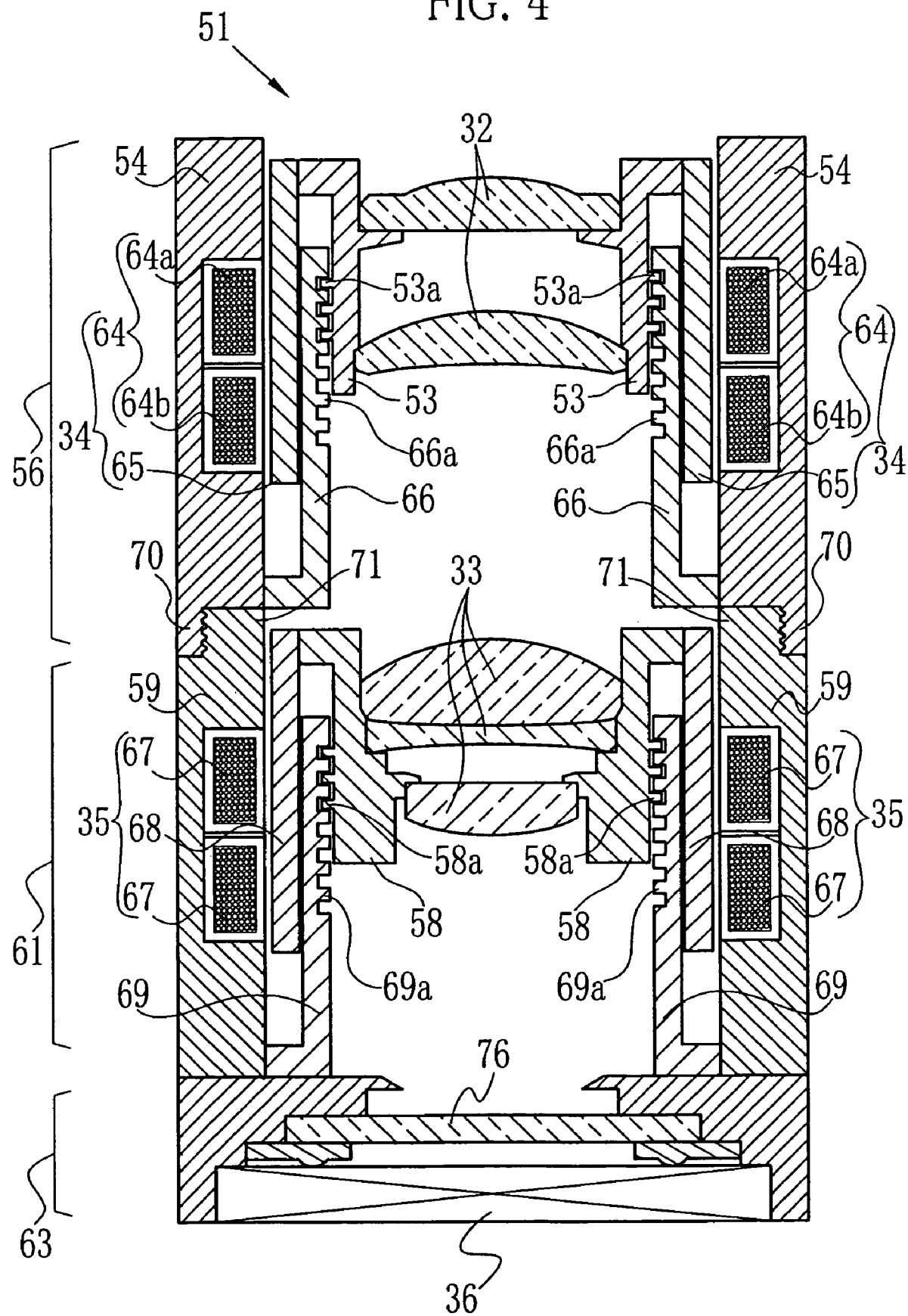
FIG. 4 is a section view showing an imaging device according to the present invention.
Figure 5:
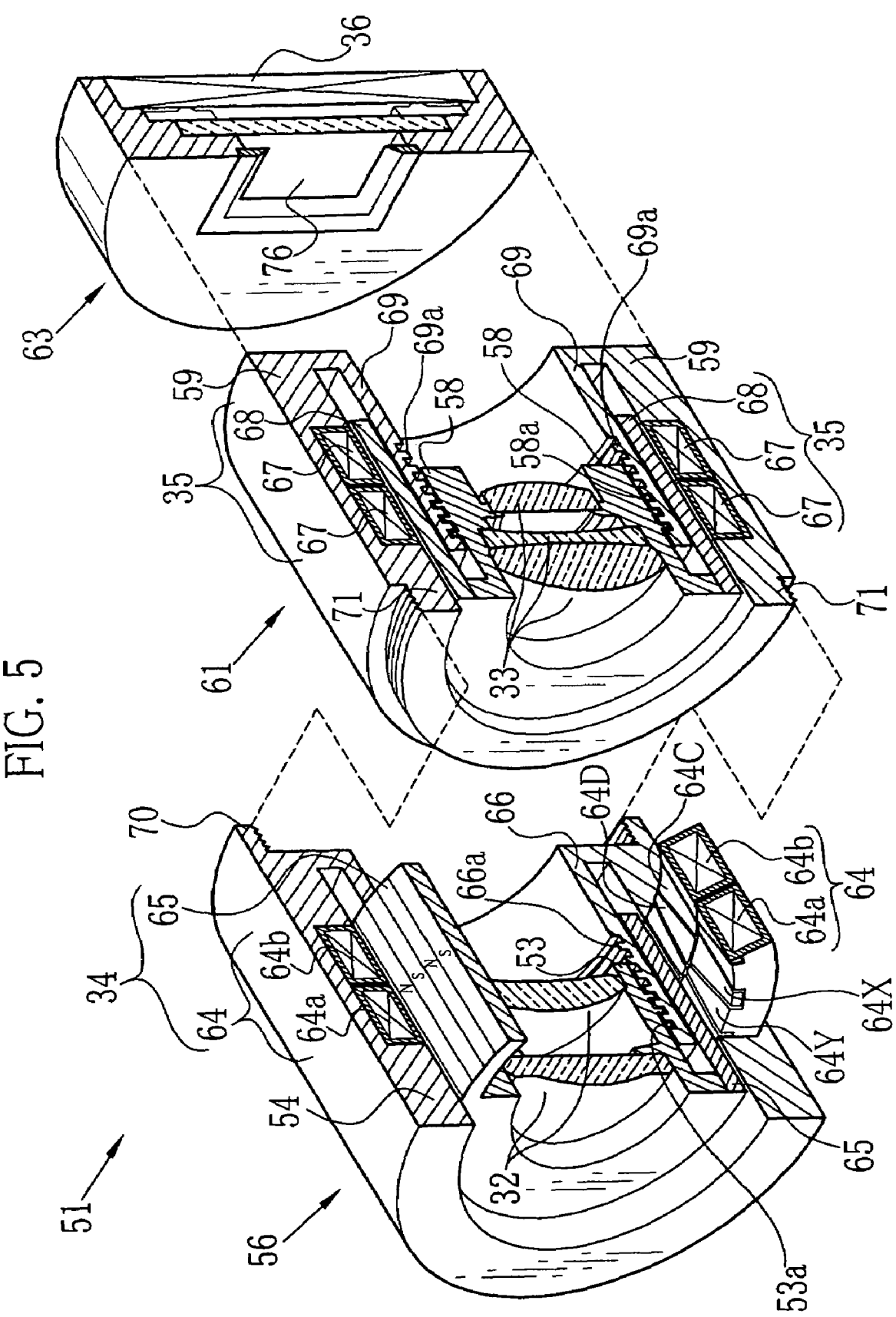
FIG. 5 is an exploded perspective view showing the imaging device.
Figure 6:
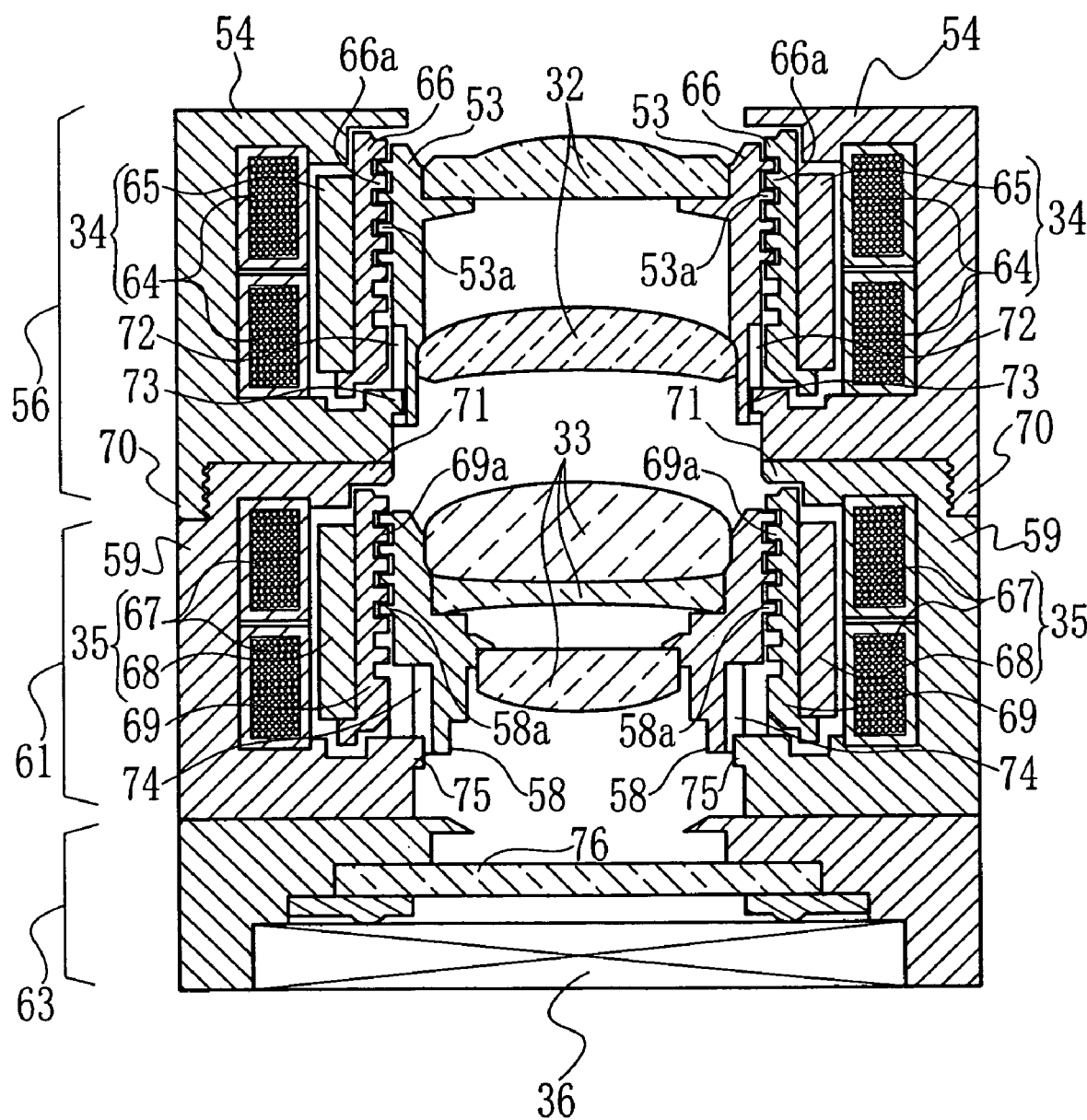
FIG. 6 is a section view showing an imaging device of another embodiment.

Although the inside of the taking lens 3 is described later in detail with FIGS. 4 to 6, the zoom-lens group 32 and the focus-lens group 33 are disposed. The respective lens groups 32 and 33 are moved in the optical-axis direction by means of a zooming motor 34 and a focusing motor 35 respectively comprising a hollow stepping motor. The lens groups 32 and 33 are constituted with a plurality of lenses. However, the lens groups 32 and 33 may be a single lens such as shown in the drawing.

The taking lens 3 is provided with a first lens unit and a second lens unit, which are described later in detail. The first lens unit includes the zooming motor 34 for moving the zoom-lens group 32 in the optical-axis direction in response to an input of a zoom-lens movement signal outputted from the CPU 31. The second lens unit includes the focusing motor 35 for moving the focus-lens group 33 in the optical-axis direction in response to an input of a focus-lens movement signal outputted from the CPU 31. The zoom-lens movement signal and the focus-lens movement signal are respectively inputted into the zooming motor 34 and the focusing motor 35 by a motor controlling circuit 50 (lens controller).

The CCD image sensor 36, which is the solid-state image sensor, is disposed behind the focus-lens group 33. The CCD image sensor 36 takes subject light, which has passed through the taking lens 3 and is focused on a light-receiving surface of the CCD image sensor 36, to output an analog image signal. The CCD image sensor 36 has an electronic shutter function for performing a shutter-release operation in association with handling of the release button 9. The electronic shutter function is controlled on the basis of a timing signal (clock pulse) inputted from a timing generator 37.

The analog image signal outputted from the CCD image sensor 36 is inputted into a CDS/AMP circuit 38 comprising a correlation double sampling circuit (CDS) and an amplifier (AMP). The CDS produces image data of R, G and B from the analog signal outputted from the CCD image sensor 36. The AMP amplifies the image data of R, G, and B produced by the CDS. After that, the analog image data of R, G and B are converted into digital image data of R, G and B by an A/D converter (A/D) 39. An image input controller 40 is connected to the CPU 31 via a bus 41 to control the CCD image sensor 36, the CDS/AMP circuit 38 and the A/D converter 39 in accordance with control instructions of the CPU 31.

An image-signal processing circuit 42 performs varied image processing of tone conversion, white-balance correction, gamma correction and so forth for the digital image data of R, G, and B. In addition, the image-signal processing circuit 42 performs YC-conversion processing for the digital image data of R, G and B. Before performing a shooting process under the shooting mode, the image data inputted into the image-signal processing circuit 42 is temporarily written in a VRAM 43 after performing simple image processing and simple YC-conversion processing. A video encoder 49 converts the image data, which is written in the VRAM 43, into a composite signal to show the image data on the liquid-crystal display 2 as a through image. Meanwhile, when the shooting process is performed, the image data inputted into the image-signal processing circuit 42 is recorded in a SDRAM 45 as taken-image data after performing regular image processing and regular YC-conversion processing.

A companding circuit 44 compresses the taken-image data, which is recorded in the SDRAM 45 under the shooting mode, in a predetermined compression format (for example, JPEG format) to produce an image file. The compressed image file is recorded in the memory card 13 by a media controller 46. In the meantime, a companding circuit 44 decompresses the image file, which is read from the memory card 13 by the media controller 46, under the reproducing mode to show the image file on the liquid-crystal display 2 as a reproduction image.

An AE/AWB detection circuit 47 and an AF detection circuit 48 are connected to the bus 41. The AE/AWB detection circuit 47 calculates an exposure value and a white-balance value from luminance of the image data. The AF detection circuit 48 calculates a focus position of the focus-lens group 33 from contrast of the image data. Each of the detection circuits 47 and 48 inputs a detection result into the CPU 31 via the bus 41 in response to the release button 9 depressed halfway under the shooting mode. On the basis of the detection results inputted from the respective detection circuits 47 and 48, the CPU 31 executes various processes concerning automatic exposure setting (AE control), automatic white-balance adjustment (AWB control) and automatic focusing (AF control).

The electronic camera 30 performs the shooting process in response to the release button 9 fully depressed after the half depression thereof. In other words, upon full-depression of the release button 9, the shooting process is performed such that the taken-image data obtained from the image signal of the CCD image sensor 36 is stored in the SDRAM 45 being as a preliminary memory. After the shooting process, the taken-image data stored in the SDRAM 45 is shown on the liquid-crystal display 2 as a preview reproduction image. During the shooting process, the taken-image data obtained from the image signal of the CCD image sensor 36 is stored in the memory card 13.

Next, an imaging device 51 according to the present invention is described below with FIGS. 4 and 5. As shown in FIGS. 4 and 5, the imaging device 51 comprises the first lens unit 56, the second lens unit 61 and an imaging unit 63.

The first lens unit 56 comprises a first fixed barrel 54 by which a first lens frame 53 holding the first lens group 32 is movably supported in the optical-axis direction. The first fixed barrel 54 includes the hollow stepping motor (first driver) 34 (described later) for moving the first lens frame 53 in the optical-axis direction in response to the first lens-movement signal inputted from the CPU 31 shown in FIG. 3. The second lens unit 61 comprises a second fixed barrel 59 by which a second lens frame 58 holding the second lens group 33 is movably supported in the optical-axis direction. The second fixed barrel 59 includes the hollow stepping motor (second driver) 35 (described later) for moving the second lens frame 58 in the optical-axis direction in response to the second lens-movement signal inputted from the CPU 31 shown in FIG. 3.

Figure 3:
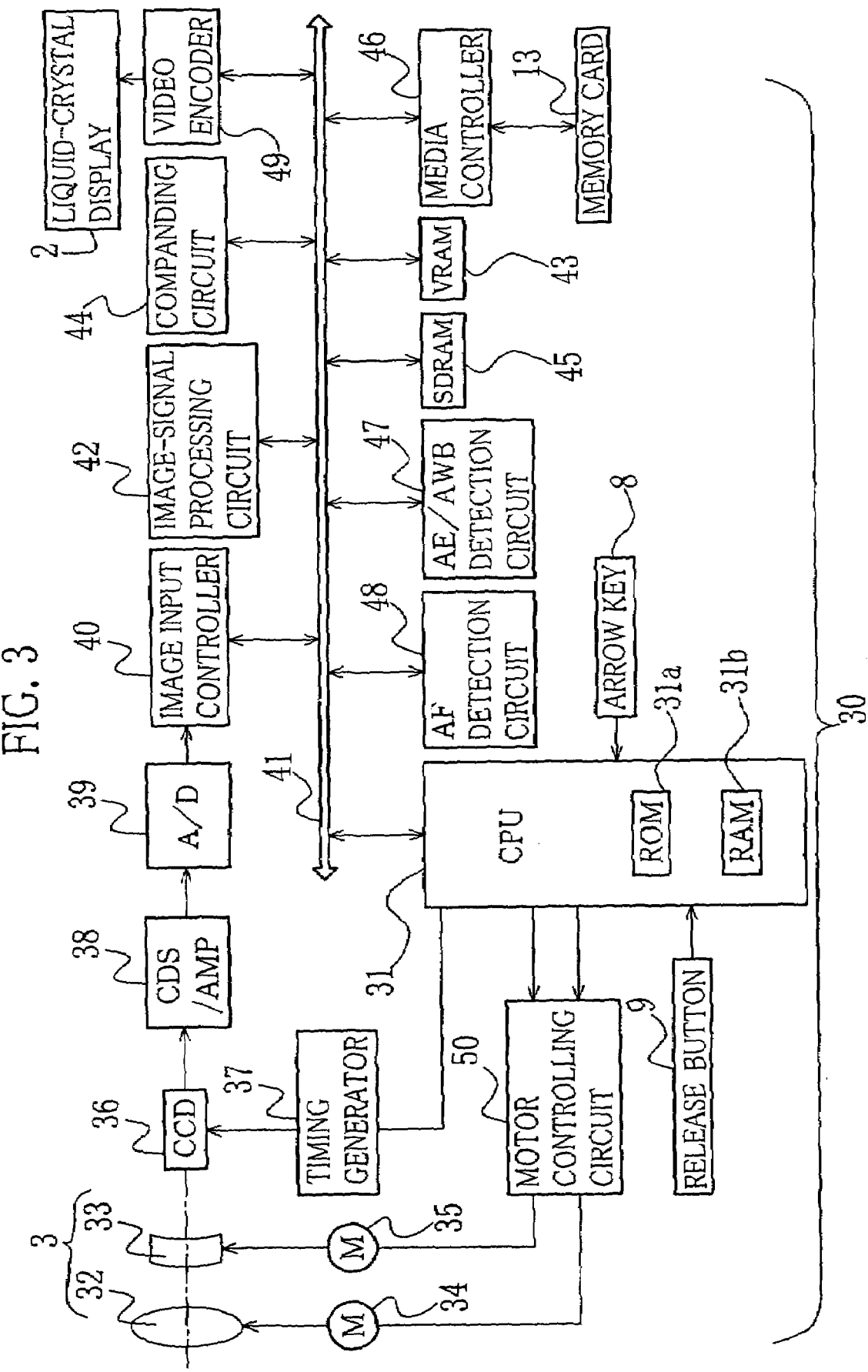
FIG. 3 is a block diagram showing an electrical structure of an electronic camera according to the present invention.

The motor controlling circuit (lens controller) 50 shown in FIG. 3 inputs the first and second lens-movement signals of the CPU 31 into the hollow stepping motors 34 (first driver) and 35 (second driver) respectively. The imaging device 51 comprises the imaging unit 63 including the CCD image sensor (solid-state image sensor) 36. The second fixed barrel 59 and the imaging unit 63 are fixed in series so as to confront a rear side of the second fixed barrel 59 with the light-receiving surface of the CCD image sensor 36. The subject light having passed through the first and second lens groups 32 and 33 passes through a low-pass filter 76, which is attached to the imaging unit 63, and is received by the CCD image sensor 36. By virtue of the low-pass filter 76, troubles of pseudo color, moire and so forth are reduced.

Next, a structure of the hollow stepping motor (first driver) 34 is described bellow. The hollow stepping motor 34 comprises a cylindrical first stator 64 and a cylindrical first rotor 65 coaxially disposed with the first stator 64. The first stator 64 generates magnetic fields in the first fixed barrel 54 made of plastic material. The first rotor 65 is rotated relative to the first stator 64 by the magnetic fields generated by the first stator 64. The inside of the first rotor 65 is provided with the first lens frame 53, which holds the first lens group 32 so as to make the optical axis thereof coincide with an axis of the first rotor 65.

The first lens frame 53 holds the first lens group 32. A part of the first lens frame 53 is fixed to a part of the first rotor 65 by means of adhesive. Incidentally, it is preferable that the first lens frame 53 and the first rotor 65 are fixed at a place where the first rotor 65 does not confront the first stator 64. The first lens frame 53 comprises a male helicoid 53a formed at a circumference thereof. A first helicoid barrel (first conversion mechanism) 66 converts a direction of the rotational force of the first rotor 65 into the optical-axis direction of the first lens group 32. The first helicoid barrel 66 is secured to the first fixed barrel 54. A male helicoid 66a is formed on an inner surface of the first helicoid barrel 66. The male helicoid 66a is a helical groove for meshing with the male helicoid 53a of the first lens frame 53.

Upon the rotation of the first rotor 65, the first lens frame 53 is integrally rotated with the first rotor 65. This rotation is transmitted to the male helicoid 66a of the first helicoid barrel 66 via the male helicoid 53a of the first lens frame 53 so that the first lens frame 53 is moved in the optical-axis direction with rotation. In other words, the conversion mechanism 66 moves the first lens group 32 in the optical-axis direction by the rotation of the first rotor 65.

Successively, a structure of the hollow stepping motor (second driver) 35 is described below. The hollow stepping motor 35 has the similar structure with the hollow stepping motor 34. The hollow stepping motor 35 comprises a cylindrical second stator 67 and a cylindrical second rotor 68 coaxially disposed with the second stator 67. The second stator 67 generates magnetic fields in the second fixed barrel 59 made of plastic material. The second rotor 68 is rotated relative to the second stator 67 by the magnetic fields generated by the second stator 67. The inside of the second rotor 68 is provided with the second lens frame 58, which holds the second lens group 33 so as to make the optical axis thereof coincide with an axis of the second rotor 68. The second lens frame 58 holds the second lens group 33, and at the same time, is joined to the second rotor 68.

A part of the second lens frame 58 is fixed to a part of the second rotor 68 by means of adhesive. By the way, it is preferable that the second lens frame 58 and the second rotor 68 are fixed at a place where the second rotor 68 does not confront the second stator 67.

The second lens frame 58 comprises a male helicoid 58a formed at a circumference thereof. A second helicoid barrel (second conversion mechanism) 69 converts a direction of the rotational force of the second rotor 68 into the optical-axis direction of the second lens group 33. The second helicoid barrel 69 is secured to the second fixed barrel 59. A male helicoid 69a is formed on an inner surface of the second helicoid barrel 69. The male helicoid 69a is a helical groove for meshing with the male helicoid 58a of the second lens frame 58. Upon the rotation of the second rotor 68, the second lens frame 58 is integrally rotated with the second rotor 68. This rotation is transmitted to the male helicoid 69a of the second helicoid barrel 69 via the male helicoid 58a of the second lens frame 58 so that the second lens frame 58 is moved in the optical-axis direction with rotation. In other words, the conversion mechanism 69 moves the second lens group 33 in the optical-axis direction by the rotation of the second rotor 68.

Screw threads are formed at a rear end of the first fixed barrel 54. These screw threads constitute a first connector 70 for connecting the first lens unit 56 to the second lens unit 61. Moreover, other screw threads are formed at a front end of the second fixed barrel 59 to constitute a second connector 71 for connecting to the first lens unit 56. The first and second lens units 56 and 61 are fixed to each other by means of the screw threads of the first and second connectors 70 and 71, and are fitted so as to be connected in series. In order to keep optical performance of the imaging device 51 in good conditions, it is necessary to maintain a constant relative position of the connected first and second lens units 56 and 61 in the optical direction. By correctly managing a number of the screw threads of the respective connectors 70 and 71, it is possible to prevent a lens interval of the connected first and second lens groups 32 and 33 from scattering so that the optical performance is kept in the good condition.

An operation of the imaging device 51 of the present invention is described below with FIGS. 1 to 5. In a state that a power supply of the camera-equipped cell-phone 1 is turned on, the shooting-mode button 10 is pressed to start the shooting mode. Upon starting the shooting mode, a subject image taken by the CCD image sensor 36 is shown on the liquid-crystal display 2.

Under the shooting mode, one of the right button and the left button of the arrow key 8 is pressed. In response to this, the CPU 31 sends the motor controlling circuit 50 a signal for varying the optical zoom magnification. In the imaging device of the present invention, the first and second lens groups 32 and 33 are individually moved to vary the optical zoom magnification. Data concerning the displacement of the lens groups 32 and 33 is stored in the memory in advance.

Upon pressing the right button of the arrow key 8, for example, a signal for raising the optical zoom magnification is sent from the CPU 31 to the motor controlling circuit 50.

In response to the command of the CPU 31, the motor controlling circuit 50 sends drive signals to the zooming motor 34 and the focusing motor 35. Thus, the first lens group 32 for varying the magnification and the second lens group 33 for focusing are individually moved in the optical-axis direction so that the magnification of the optical lenses is raised. Meanwhile, upon pressing the left button of the arrow key 8, a signal for lowering the optical zoom magnification is sent from the CPU 31 to the motor controlling circuit 50. In response to the command of the CPU 31, the motor controlling circuit 50 sends, the drive signals to the zooming motor 34 and the focusing motor 35. Thus, the first and second lens groups 32 and 33 are individually moved in the optical-axis direction so that the magnification of the optical lenses is lowered.

After determining the optical zoom magnification, the release button 9 for shooting the subject is pressed halfway. In response to this, the various processes concerning the automatic exposure setting (AE control), the automatic white-balance adjustment (AWB control) and the automatic focusing (AF control) are performed. In association with the release button 9 pressed halfway, the CPU 31 sends a signal to the AF detection circuit 48, and then, the AF detection circuit 48 sends the CPU 31 a reply signal for performing contrast AF control. In response to the reply signal, the CPU 31 sends a signal to the motor controlling circuit 50. Upon this signal, the motor controlling circuit 50 drives the focusing motor 35 to move the second lens group 33 for focusing. During the movement of the focus-lens group 33, is searched a position where the CCD image sensor 35 has the highest contrast signal. The focus-lens group 33 is moved to the position of the highest contrast, and focusing is completed.

Successively, the release button 9 is fully pressed after being pressed halfway. In response to this, the shooting process is executed. In other words, upon fully pressing the release button 9, the shooting process is executed such that the taken-image data obtained from the image signal of the CCD image sensor 36 is stored in the SDRAM 45 being as the preliminary memory. After the shooting process, the taken-image data stored in the SDRAM 45 is shown on the liquid-crystal display 2 as the preview reproduction image. In the shooting process, the taken-image data obtained from the image signal of the CCD image sensor 36 is recorded in the memory card 13.

Next, an imaging device 81 of another embodiment according to the present invention is described below with FIG. 6. As shown in this drawing, the imaging device 81 comprises the first lens unit 56, the second lens unit 61 and the imaging unit 63. Incidentally, components being functionally identical with those of the foregoing embodiment are denoted by the same reference numerals.

The first lens unit 56 includes the first fixed barrel 54 movably holding the first lens frame 53 in the optical axis direction. The first lens frame 53 holds the first lens group 32 comprising a plurality of lenses. Moreover, the first fixed barrel 54 contains the hollow stepping motor (first driver) 34 (described later) for moving the first lens frame 53 in the optical-axis direction in response to the lens-movement signal inputted from the CPU 31 shown in FIG. 3.

The second lens unit 61 includes the second fixed barrel 59 movably holding the second lens frame 58 in the optical axis direction. The second lens frame 58 holds the second lens group 33 comprising a plurality of lenses. The first and second fixed barrels 54 and 59 are fixed in series in the optical-axis direction. Moreover, the second fixed barrel 59 contains the hollow stepping motor (second driver) 35 (described later) for moving the second lens frame 58 in the optical-axis direction in response to the second lens-movement signal inputted from the CPU 31 shown in FIG. 3.

The imaging device 81 further comprises the motor controlling circuit (lens controller) 50 shown in FIG. 3 to input the first lens-movement signal and the second lens-movement signal respectively into the hollow stepping motors 34 (first driver) and 35 (second driver) from the CPU 31 shown in FIG. 3. Furthermore, the imaging device 81 comprises the imaging unit 63 including the CCD image sensor (solid-state image sensor) 36. The second fixed barrel 59 and the imaging unit 63 are fixed in series so as to confront the rear side of the second fixed barrel 59 with the light-receiving surface of the CCD image sensor 36.

The subject light having passed through the first and second lens groups 32 and 33 passes through the low-pass filter 76, which is attached to the imaging unit 63, and is received by the CCD image sensor 36. By virtue of the low-pass filter 76, troubles of pseudo color, moire and so forth are reduced.

Next, a structure of the hollow stepping motor (first driver) 34 is described below. The hollow stepping motor 34 comprises the cylindrical first stator 64 and the cylindrical first rotor 65 coaxially disposed with the first stator 64. The first stator 64 generates magnetic fields in the first fixed barrel 54 made of plastic material. The first rotor 65 is rotated relative to the first stator 64 by the magnetic fields generated by the first stator 64. The inside of the first rotor 65 is provided with the first lens frame 53, which holds the first lens group 32 so as to make the optical axis thereof coincide with the axis of the first rotor 65.

The inside (inner surface) of the first rotor 65 and the outside (outer surface) of the first helicoid barrel (first conversion mechanism) 66 are fixed by adhesive. The first helicoid barrel 66 comprises the male helicoid 66a for converting the direction of the rotational force of the first rotor 65 into the optical-axis direction of the first lens group 32. The male helicoid 66a meshes with the male helicoid 53a formed on the circumference of the first lens frame 53. Further, the first lens frame 53 comprises a first straight groove 72 for moving the first lens group 32 straight in the optical-axis direction. The first fixed barrel 54 comprises a first guide protrusion 73 to lead the first straight groove 72.

The first helicoid barrel 66 is integrally rotated with the first rotor 65. The rotation of the first helicoid barrel 66 is transmitted to the male helicoid 53a of the first lens frame 53 via the male helicoid 66a so that the first lens frame 53 is moved in the optical-axis direction. While the first lens frame 53 is moved, the first straight groove 72 is led by the first guide protrusion 73 so that the first lens frame 53 is moved without rotating.

Next, a structure of the hollow stepping motor (second driver) 35 is described below. The hollow stepping motor 35 has the similar structure with the hollow stepping motor 34. The hollow stepping motor 35 comprises the cylindrical second stator 67 and the cylindrical second rotor 68 coaxially disposed with the second stator 67. The second stator 67 generates magnetic fields in the second fixed barrel 59 made of plastic material. The second rotor 68 is rotated relative to the second stator 67 by the magnetic fields generated by the second stator 67. The inside of the second rotor 68 is provided with the second lens frame 58, which holds the second lens group 33 so as to make the optical axis thereof coincide with the axis of the second rotor 68.

The inside (inner surface) of the second rotor 68 and the outside (outer surface) of the second helicoid barrel (second conversion mechanism) 69 are fixed by adhesive. The second helicoid barrel 69 comprises the male helicoid 69a for converting the direction of the rotational force of the second rotor 68 into the optical-axis direction of the second lens group 33. The male helicoid 69a meshes with the male helicoid 58a formed on the circumference of the second lens frame 58. Further, the second lens frame 58 comprises a second straight groove 74 for moving the second lens group 33 straight in the optical-axis direction. Furthermore, the second fixed barrel 59 comprises a second guide protrusion 75 to lead the second straight groove 74.

The second helicoid barrel 69 is integrally rotated with the second rotor 68. The rotation of the second helicoid barrel 69 is transmitted to the male helicoid 58a of the second lens frame 58 via the male helicoid 69a so that the second lens frame 58 is moved in the optical-axis direction. While the second lens frame 58 is moved, the second straight groove 74 is led by the second guide protrusion 75 so that the second lens frame 58 is moved without rotating.

Similarly to the foregoing embodiment, the first connector 70 constituted with the screw thread is formed at the rear end of the first fixed barrel 54, and the second connector 71 constituted with the screw thread is formed at the front end of the second fixed barrel 59. The screw threads of the first and second connectors 70 and 71 mesh with each other to connect the first and second lens units 56 and 61 in series in the optical axis direction. By the way, since an operation of this embodiment is similar to that of the above-described imaging device 51, description thereof is abbreviated.

In the imaging devices 51 and 81 according to the present invention, a diameter of the rear side of the first fixed barrel 54 is substantially same with that of the front side of the second fixed barrel 59. Thus, it is easy to connect the first and second fixed barrels 54 and 59. Further, it is easy to fix (assemble) the first and second lens units 56 and 61 in series in the optical-axis direction. The first and second lens units 56 and 61 are individually assembled and are merely coupled at the last. In virtue of this, assembling operation is simplified.

Next, the rotor and the stator of the hollow stepping motor employed in the above imaging devices 51 and 81 are concretely described below with FIG. 5. The hollow stepping motors 34 and 35 are of a claw-pole type.

Hereinafter, only the first driver 34 is described. However, the principle of the hollow stepping motor is equally applied to the first and second drivers 34 and 35 shown in FIGS. 4 to 6. The hollow stepping motor (first driver) 34 comprises the stator 64 and the rotor 65 made of magnet. The stator 64 includes two coil portions of an upper coil portion 64a and a lower coil portion 64b, which have an identical structure. In this embodiment, concrete description concerning the structure of the lower coil portion 64b is abbreviated, and only the structure of the upper coil portion 64a is described.

The upper coil portion 64a is constituted such that an inner piece and an outer piece contain a wound circular coil. Comb-shaped magnetic teeth 64X and 64Y are alternately formed at leading portions of the respective inner and outer pieces. The upper coil portion 64a is attached to the first fixed barrel 54 so as to form an air gap of a predetermined length between the magnetic teeth 64X, 64Y and an outer surface of a permanent magnet of rotor 65. The comb-shaped magnetic teeth 64X and 64Y of the stator 64 are arranged so as to be separated from each other.

Pulse currents alternately flow in the coils of the magnetic teeth 64X (64Y) of the upper coil portion 64a and comb-shaped magnetic teeth 64C (64D) of the lower coil portion 64b. While the pulse current flows, lines of magnetic force are generated at the region residing between the magnetic teeth 64X (64C) and the magnetic teeth 64Y (64D). The pulse current flows to make one of the magnetic teeth 64X and 64Y the North pole and to make the other thereof the South pole. In virtue of this, magnetic fields of the North Pole and the South Pole are alternately generated along the cylindrical inner surface of the stator 64.

The rotor 65 is a permanent magnet, which is alternately magnetized in the North pole and the South pole along the cylindrical circumference. The magnetic field generated by the stator 64 causes repulsive force and attractive force by which the rotor 65 is rotated relative to the stator 64. The rotor 65 is magnetized in forty-eight poles, and the comb-shaped magnetic tooth 64X and 64Y of the stator 64 are respectively formed by forty-eight. The magnetic teeth (64Y, for example) of the upper coil portion 64a are positioned so as to be shifted relative to the magnetic teeth (64C, for example) of the lower coil portion 64b by a half amount of the tooth (by half pitch). When the pulse current flows in the stator 64, the rotor 65 rotates step by step, wherein one step corresponds to one pole, and makes one rotation after forty-eight steps.

When the rotor 65 is rotated in a forward direction, the current flows in an order of a forward direction of the upper coil portion 64a, a forward direction of the lower coil portion 64b, a backward direction of the upper coil portion 64a and a backward direction of the lower coil portion 64b. By repeatedly letting the current flow in this order, the rotor 65 is surely rotated in the forward direction. In contrast, by repeatedly letting the current flow in an order of the forward direction of the upper coil portion 64a, the backward direction of the lower coil portion 64b, the backward direction of the upper coil portion 64a and the forward direction of the lower coil portion 64b, the rotor 65 is rotated in the backward direction.

Incidentally, the above-described first and second lens units 56 and 61 are applicable to a camera (photographic device) using a silver-salt film, which is a silver-salt camera, an instant camera and so forth. In the imaging devices 51 and 81, the hollow stepping motors 34 and 35 of the claw-pole type are used. However, as to the first and second drivers 34 and 35, it is possible to adopt the other stepping motor, an actuator utilizing a rotation of a DC motor and so forth, and a driver utilizing expanding and contracting of a piezoelectric device. By the way, the DC motor uses a permanent magnet as a stator and uses a coil as a rotor (armature). The DC motor switches a direction of a current flowing in the armature to generate a rotational force by repulsive and attractive forces of magnetic forces.

In the above-described imaging devices 51 and 81 according to the present invention, both of the first and second drivers 34 and 35 employ the hollow stepping motor. However, the different actuators (the piezoelectric-element actuator, the stepping motor and the DC motor), which are mentioned above, may be properly combined. For instance, it is conceivable that the first driver 34 employs the hollow stepping motor and the second driver 35 employs the piezoelectric-element actuator.

In the above imaging devices 51 and 81, the male helicoid is utilizes to move the lens group in the optical-axis direction. However, the lens group may be moved in the optical-axis direction by utilizing a cam groove, a cam pin and so forth. Further, although the CCD image sensor 36 is used in the present invention, a CMOS image sensor and so forth may be used.

In the above imaging devices 51 and 81, the first connector 70 of the first lens unit 56 has the convex shape and the second connector 71 of the second lens unit 61 has the concave shape. However, the first connector 70 may have the concave shape and the second connector may have the convex shape. Further, the first and second lens units 56 and 61 may be connected in series in the optical-axis direction by the other connecting way. For example, the faces of the first and second lens units 56 and 61 confronting each other may be fixed by screws and adhesive.

The above-described lens device including the first and second lens units 56 and 61 may be employed in optical devices of a projector, an electronic camera and a pick-up lens unit to be used for a DVD, a CD-ROM and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens device for moving a first lens group and a second lens group in an optical-axis direction, said lens device comprising:
    a first lens frame for holding said first lens group;
    a first fixed barrel for movably holding said first lens frame in said optical-axis direction;
    a first driver incorporated in said first fixed barrel to move said first lens frame in said optical-axis direction;
    a second lens frame for holding said second lens group;
    a second fixed barrel for movably holding said second lens frame in said optical-axis direction, said second fixed barrel being joined to said first fixed barrel in series in said optical-axis direction;
    a second driver incorporated in said second fixed barrel to move said second lens frame in said optical-axis direction; and
    a lens controller for inputting first and second lens-movement signals, in response to which said first and second lens frames are moved, into said first and second drivers respectively,
    wherein said first driver comprises:
    a cylindrical first stator for generating magnetic fields at the inside of said first fixed barrel;
    a cylindrical first rotor coaxially disposed with said first stator to rotate relative to said first stator in virtue of the magnetic fields generated by said first stator, said first lens frame being disposed in said first rotor so as to make an optical axis of said first lens group coincide with an axis of said first rotor; and
    a first conversion mechanism for converting a direction of a rotational force of said first rotor into said optical-axis direction to transmit the rotational force to said first lens frame.

2. A lens device according to claim 1, wherein said first lens frame, said first fixed barrel and said first driver constitute a first lens unit including a first connector formed at a rear end of said first fixed barrel, and said second lens frame, said second fixed barrel and said second driver constitute a second lens unit including a second connector formed at a front end of said second fixed barrel, said first and second lens units being joined via said first and second connectors in series in said optical-axis direction.

3. A lens device according to claim 2, wherein said first and second lens units are joined by means of screws formed on said first and second connectors.

4. A lens device according to claim 2, wherein a diameter of the rear end of said first fixed barrel is substantially same with a diameter of the front end of said second fixed barrel.

5. A lens device according to claim 1, wherein said second driver comprises:
    a cylindrical second stator for generating magnetic fields at the inside of said second fixed barrel;
    a cylindrical second rotor coaxially disposed with said second stator to rotate relative to said second stator in virtue of the magnetic fields generated by said second stator, said second lens frame being disposed in said second rotor so as to make an optical axis of said second lens group coincide with an axis of said second rotor; and
    a second conversion mechanism for converting a direction of a rotational force of said second rotor into said optical-axis direction to transmit the rotational force of the second rotor to said second lens frame.

6. A lens device according to claim 1, further comprising:
    a straight groove formed in said first lens frame; and
    a guide protrusion for leading said straight groove, said guide protrusion and said straight groove straightly moving said first lens frame without rotation when said first lens frame is moved in said optical-axis direction.

7. A lens device according to claim 6, wherein said guide protrusion is formed on said first fixed barrel.

8. A lens device according to claim 1, wherein said first conversion mechanism comprises:
    a helicoid barrel fixed to an inner surface of said first rotor, said helicoid barrel meshing with helicoids formed on a circumferential surface of said first lens frame.

9. A lens device according to claim 5, further comprising:
    a straight groove formed in said second lens frame; and
    a guide protrusion for leading said straight groove, said guide protrusion and said straight groove straightly moving said second lens frame without rotation when said second lens frame is moved in said optical-axis direction.

10. A lens device according to claim 9, wherein said guide protrusion is formed on said second fixed barrel.

11. A lens device according to claim 5, wherein said second conversion mechanism comprises:
    a helicoid barrel fixed to an inner surface of said second rotor, said helicoid barrel meshing with helicoids formed on a circumferential surface of said second lens frame.

12. An imaging device comprising an imaging unit including a solid-state image sensor, and a lens device fixed to said imaging unit in series, said lens device moving a first lens group and a second lens group in an optical-axis direction and comprising:
    a first lens frame for holding said first lens group;
    a first fixed barrel for movably holding said first lens frame in said optical-axis direction;
    a first driver incorporated in said first fixed barrel to move said first lens frame in said optical-axis direction;
    a second lens frame for holding said second lens group;
    a second fixed barrel for movably holding said second lens frame in said optical-axis direction, said second fixed barrel being joined to said first fixed barrel in series;
    a second driver incorporated in said second fixed barrel to move said second lens frame in said optical-axis direction; and
    a lens controller for inputting first and second lens-movement signals, in response to which said first and second lens frames are moved, into said first and second drivers respectively, wherein said second fixed barrel and said imaging unit are joined in series so as to confront a rear end of said second fixed barrel with a light-receiving surface of said solid-state image sensor, wherein said first driver comprises:

a cylindrical first stator for generating magnetic fields at the inside of said first fixed barrel;

a cylindrical first rotor coaxially disposed with said first stator to rotate relative to said first stator in virtue of the magnetic fields generated by said first stator, said first lens frame being disposed in said first rotor so as to make an optical axis of said first lens group coincide with an axis of said first rotor; and a first conversion mechanism for converting a direction of a rotational force of said first rotor into said optical-axis direction to transmit the rotational force to said first lens frame.

13. An imaging device according to claim 12, wherein said imaging device is an electronic camera.

14. An imaging device according to claim 12, wherein said imaging device is built in a cell-phone.

* * * * *